(12) United States Patent
Kato (10) Patent No.: US 6,896,347 B2
(45) Date of Patent: May 24, 2005

(54) IMAGE PROCESSING METHOD, IMAGE PROCESSING APPARATUS, STORAGE MEDIUM AND COMPUTER PROGRAM

(75) Inventor: Minako Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 10/255,718

(22) Filed: Sep. 27, 2002

(65) Prior Publication Data

US 2003/0063146 A1 Apr. 3, 2003

(30) Foreign Application Priority Data

Oct. 1, 2001 (JP) ........................................ 2001-305406

(51) Int. Cl.[7] ............................ B41J 2/205; B41B 15/00
(52) U.S. Cl. ............................ 347/15; 358/1.9; 358/518
(58) Field of Search ............................ 347/15, 43, 37; 358/1.2, 1.9, 518, 520, 509, 516, 529; 382/163, 167

(56) References Cited

U.S. PATENT DOCUMENTS 5,333,070 A * 7/1994 Ichikawa ..................... 358/518
5,502,579 A * 3/1996 Kita et al. ................... 358/518
6,587,225 B1 * 7/2003 Sakatani et al. ............. 358/1.9

* cited by examiner

*Primary Examiner*—Lamson Nguyen
(74) *Attorney, Agent, or Firm*—Fitzpatrick, Cella, Harper & Scinto (57) ABSTRACT

An image processing method which converts R, G and B multivalued image signals into color signals corresponding to coloring materials used for an image forming means, comprising the step of converting an achromatic color used to control a skin color and at predetermined brightness into a predetermined value. Thus, the skin color difficult to be satisfactorily reproduced can be easily converted into a desirable color by controlling the achromatic color. Moreover, the skin color on the various media can be approximately unified by setting the achromatic color having high brightness to be approximately the same even on the plural media respectively having different paper colors.

35 Claims, 5 Drawing Sheets

IMAGE PROCESSING METHOD, IMAGE PROCESSING APPARATUS, STORAGE MEDIUM AND COMPUTER PROGRAM

BACKGROUND OF THE INVENTION

1. Field of the Invention

The present invention relates to an image processing method which converts R (red), G (green) and B (blue) multivalued image signals into color signals corresponding to coloring materials used for image formation, an image forming method which forms an image on the basis of the color signals converted by the image processing method, computer programs which execute the image processing method and the image forming method, a storage medium which stores the computer programs.

2. Related Background Art

A color ink-jet printer which is adopted as an example of a color output apparatus often represents an image by C (cyan), M (magenta) and Y (yellow) three colors or C, M, Y and K (black) four colors.

Ordinarily, in a printer, image data to be printed is converted into data for color inks of the printer on the basis of predetermined color processing parameters, and then the converted image data is actually printed. The color processing parameters respectively correspond to different modes such as a coloring material used for the image formation, a recording material on which the image is to be formed, an image forming method and the like, and these parameters are adjusted to be able to obtain an optimum image in each mode.

Hereinafter, as a method of representing colors, a method based on a color system of CIE1976 $L^*a^*b^*$ uniform color space will be explained.

Figure 5:
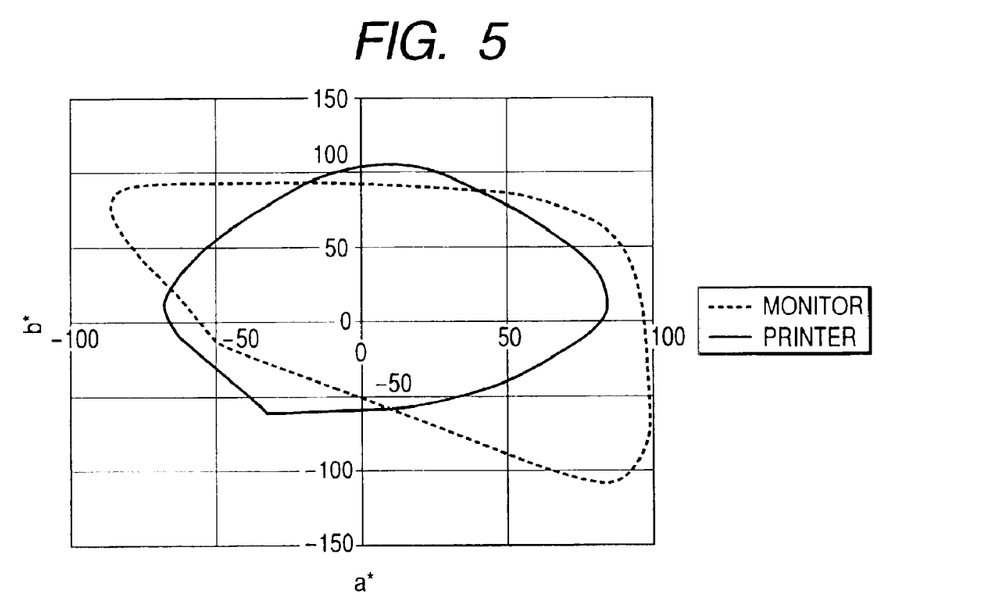
FIG. 5 is a graph showing color reproduction ranges of a monitor and a printer.

A process of converting former image data represented by R, G and B signals into C, M and Y data capable of being printed by the printer includes a process called "color space compression (or color gamut mapping)". This is the process by which the colors capable of being reproduced by additive color mixture represented by R, G and B come to correspond to the colors reproducible by the printer. Generally, a color reproduction range (or color gamut) is different for each device, and, particularly, the color reproduction range of the printer is remarkably different from that of a monitor. Ordinarily, the color reproduction range to be displayed by R, G and B on the monitor or the like is wide, whereby a conversion expression such as sRGB or the like suitable for the characteristic of the monitor is used to calculate the colors ($L^*a^*b^*$) represented by the monitor. On the other hand, the color reproduction range of the printer depends on the coloring materials of the printer and a recording medium on which the image should be formed (hereinafter, this medium is called "image-formed recording medium" for convenience of explanation). FIG. 5 is a pattern diagram showing the color ranges reproducible by the monitor and the printer. As can be understood from FIG. 5, many colors can be reproduced by the monitor but can not be reproduced by the printer. For this reason, the operation to correlate the colors reproduced by the monitor with the colors reproducible by the printer.

Figure 6:
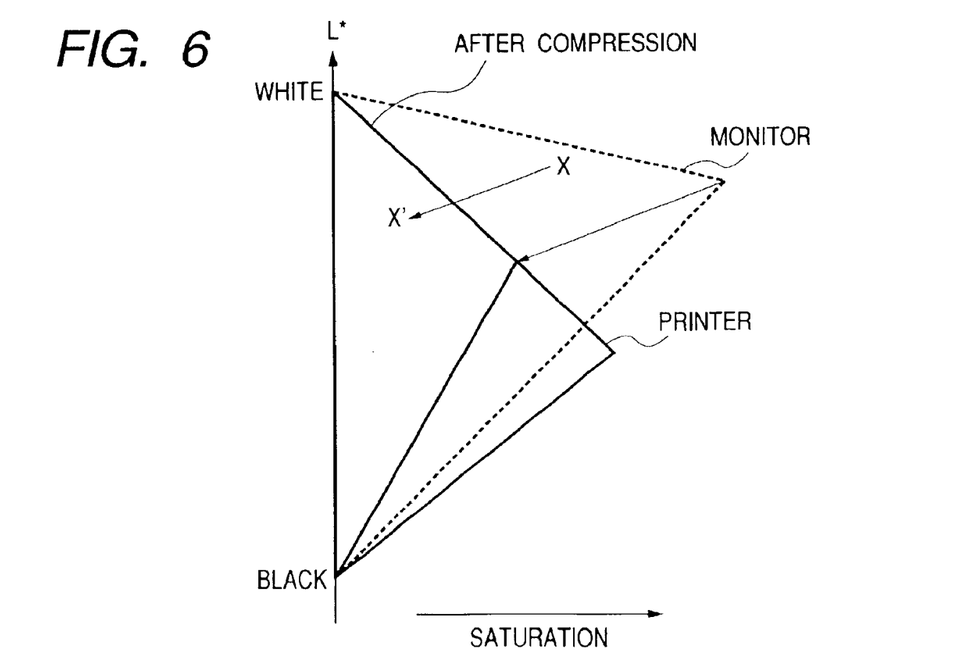
FIG. 6 is a diagram showing color reproduction range compression for the monitor and the printer.

FIG. 6 is a schematic diagram showing the section obtained by cutting the color reproduction range based on one hue. In FIG. 6, the axis of ordinate indicates brightness $L^*$, i.e., an achromatic color line from white to black (hereinafter called a gray line), the axis of abscissas indicates saturation (or chroma) calculated by $\sqrt{(a^{*2}+b^{*2})}$, the broken line indicates the data of the monitor, the solid line indicates the data of the printer, and the heavy line indicates the data after the color space compression. Although there are conventionally various known color space compression methods, the method of deforming and compressing an entire image by mapping maximum saturation points as shown in FIG. 6 is commonly used. That is, for example, a color X reproducible by the monitor but unreproducible by the printer is mapped into a color X' reproducible by both the monitor and the printer. By this method, since gradation capability can be satisfactorily maintained, whereby it is suitable particularly to reproduce a photographic image.

In a photograph, so-called "memory colors" such as a color of sky, a color of green, a color of skin (called a skin color hereinafter), and the like are important, and particularly the skin color is most important. That is, the skin color is very delicate as well as a tint and saturation. Thus, if the skin color is yellowish, too reddish or bluish even a little, this photograph makes a seriously bad impression on a viewer.

As a method of reproducing a desirable skin color, a method of mapping only a specific skin color area into a desirable skin color area after the color space compression is performed is known. However, if the skin color is reproduced in this method, a discontinuous portion appears in the vicinity of the skin color area, whereby there is a problem that a pseudo contour or the like appears in the reproduced image. Moreover, a complicated operation is necessary to reproduce the desirable skin color, whereby there is a problem that it imposes a load (or burden) on a computer used for image formation.

Incidentally, a recording apparatus can generally perform recording on various recording media. For example, the ink-jet printer can perform the recording on a plain paper, a coated paper specific to ink-jet printing, a glossy paper, and the like. Here, it should be noted that the colors of these recording media themselves are frequently different from others, whereby it is difficult to reproduce almost the same or equivalent color on the different recording media. Particularly, it is difficult to reproduce the same light color (or pale color) easily influenced by the inherent color of the paper itself, on the different recording media.

Incidentally, the L axis, i.e., the gradation (gray line) from white to black, does not change during the color space compression, whereby it is necessary to adjust from the first the gray line so that there is visually neither jump of gradation nor fluctuation of hue.

Figure 7A:
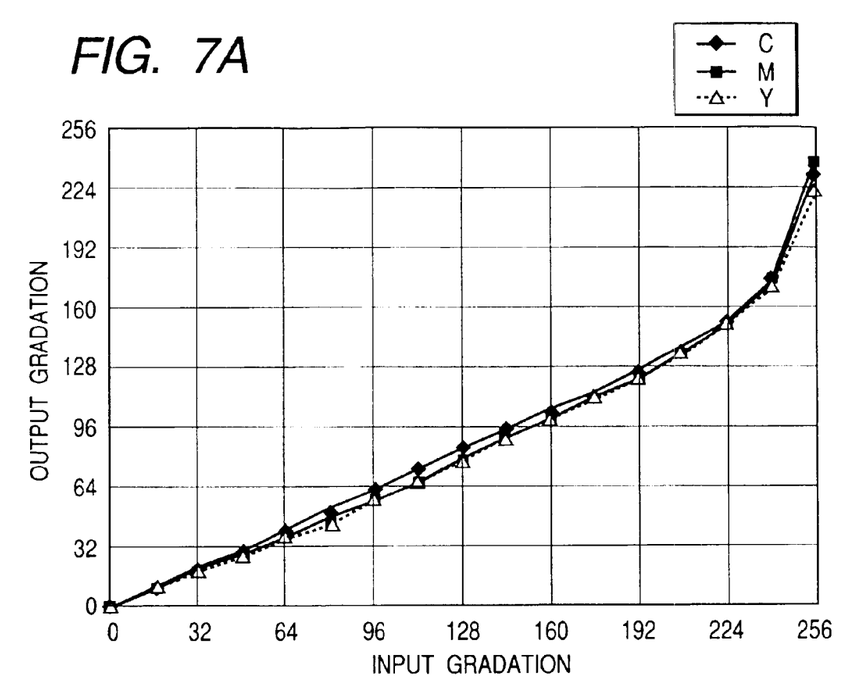
FIG. 7A is a graph showing a combination of C, M and Y inks for printing a gray line.
Figure 7B:
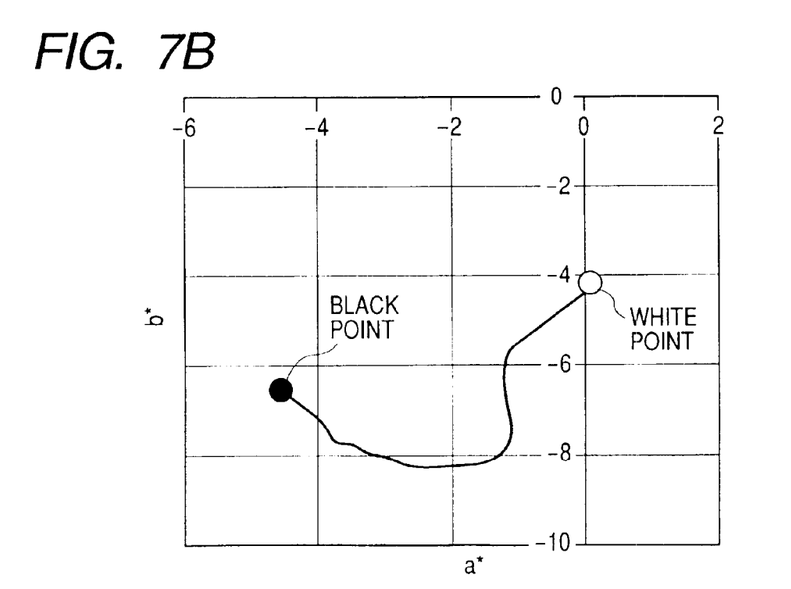
FIG. 7B is a graph showing colorimetry values of gray.

FIG. 7A is a graph showing discharge amounts of C, M and Y inks for eight-bit output values 0 to 255 (white to black) in gray scale, and FIG. 7B is a graph showing a state that colorimetry values of 17 gradations having same intervals and selected at this time from 256 gradations in the gray scale are smoothly connected with others. It should be noted that the 17 gradations include R=G=B=0 (black point, output 255) and R=G=B=255 (white point, output 0). The colors in the gray scale close to black are substantially gathered together in the vicinity of (a, b)=(−3, −8). This numeric value (a, b)=(−3, −8) represents the desirable color of gray found by the inventor in a visual experiment.

However, as can be understood from FIG. 7B, in the vicinity of white, the color does not necessarily close to the above numeric value, because the image-formed recording medium itself has the color of (a, b)=(0, −4). Thus, since a light-color area where the coloring materials to be recorded are few is strongly influenced by the color of the image-formed recording medium itself, if it intends to numerically conform the color in the vicinity of white to (a, b)=(−3, −8), it is observed that the color skips suddenly, whereby gradation capability deteriorates.

As can be understood from FIG. 6, if the color having intermediate saturation is subjected to the color space compression, then the saturation of the compressed color decreases considerably, whereby this color comes to close to the L axis (gray line). Such colors close to the gray line are greatly influenced by the color of gray line, and include many kinds of skin colors that brightness is high and saturation is low (i.e., the skin colors close to the gray line).

In the above conventional technique, it is not recognized that the reproduction of the gray line influences the reproduction of the skin color, whereby the color processing parameters for converting the gray line are adjusted without considering the skin color absolutely. Therefore, the color processing parameter of the color of light gray (or pale gray) is conventionally adjusted visually by entirely considering the connection of the gradations of gray, that is, without any concrete numerical target. Moreover, it is conventionally difficult to conform the color of the image formed on the image-formed recording medium having one color with the color of the image formed on the image-formed recording medium having other color.

SUMMARY OF THE INVENTION

The present invention has been made to solve the above problems, and an object thereof is to provide an image processing method which can improve reproducibility of a skin color by converting an achromatic color in predetermined brightness into a predetermined value and also obtain substantially the same desirable skin color even on different recording media, an image processing apparatus which operates according to the image processing method, a program which executes the image processing method, and a storage medium which stores the program.

In order to achieve the above object, the present invention is characterized by an image processing method which converts R, G and B multivalued image signals into color signals corresponding to coloring materials used for an image forming means, comprising the step of:

converting an achromatic color used to control a skin color and at predetermined brightness into a predetermined value.

According to such a structure as above, it is possible to achieve the image processing method which can reproduce the desirable skin color and further reproduce substantially the same or equivalent desirable skin color even on the different recording media, the image processing apparatus which operates according to the image processing method, the program which executes the image processing method, and the storage medium which stores the program.

DETAILED DESCRIPTION OF THE PREFERRED EMBODIMENTS

The preferred embodiments of the present invention will now be described in detail in accordance with the accompanying drawings.

(First Embodiment)

In the present embodiment, a case where an image is printed on a coated paper dedicated for ink-jet printing by an ink-jet recording apparatus using inks of three colors C, M and Y will be explained.

Figure 1:
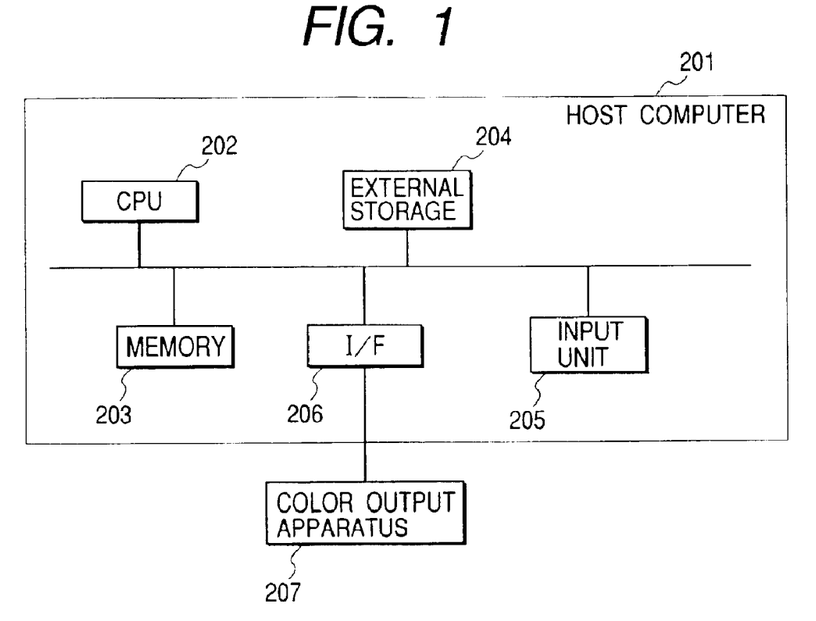
FIG. 1 is a block diagram showing an image output system applicable to the present invention.

FIG. 1 is a block diagram showing an image processing system to which the present embodiment is applied. In FIG. 1, a host computer 201 is equipped with a CPU 202, a memory 203, an external storage 204, an input unit 205, and an I/F (interface) 206 interfacing with a printer. The CPU 202 achieves procedures of a coloring process, a quantization process and the like (later described) by performing a process according to a program (printer driver) stored in the memory 203. Here, it should be noted that the program is stored in the external storage 204 or supplied from an external apparatus. Besides, the host computer 201 which is connected to a color output apparatus 207 through the I/F 206 transmits image data subjected to the coloring process to the color output apparatus 207 acting as the ink-jet recording apparatus, whereby the color output apparatus 207 prints and records the processed image data.

Figure 2:
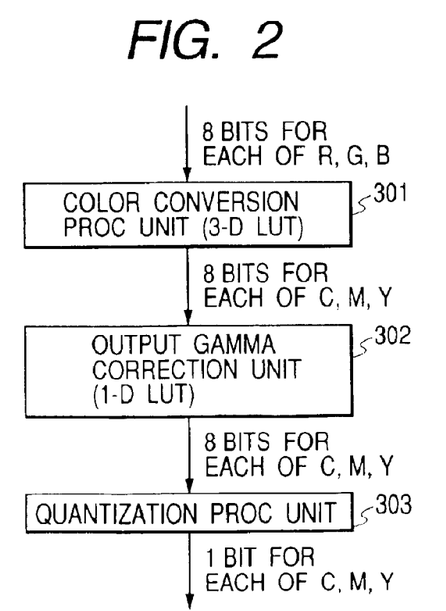
FIG. 2 is a block diagram for explaining an image processing procedure applicable to the present invention.

FIG. 2 is a block diagram for explaining an image process achieved by the above program. That is, FIG. 2 shows the image processing procedure that input eight-bit (256 gradations) image data for each of R, G and B is output as one-bit data for each of C, M and Y.

The R, G and B eight-bit image data are first converted (i.e., color space compression) into C, M and Y eight-bit data (eight bits for each of C, M and Y) conformed to printer output colors, by a three-dimensional LUT (look-up table). This conversion process is to convert RGB-system colors in an input system into CMY-system colors in an output system. Although the input data is often based on three primary colors (R, G and B) according to additive color mixture of a light emitter such as a display, C, M and Y coloring materials are used in the printer, whereby the above conversion process is necessarily performed. The process of correlating the gray scale with the C, Y and Y inks (i.e., RGB/CMY conversion to convert color at a time when the gray scale is high brightness into a predetermined target value) is performed in this conversion process.

The three-dimensional LUT used in the coloring process discretely holds the data obtained by an interpolation process. However, the detailed explanation of the interpolation process will be omitted because it is a known technique.

Then, in an output gamma correction unit 302, the C, M and Y eight-bit image data subjected to the coloring process are further subjected to output gamma correction by using a one-dimensional LUT. That is, since the relation between the number of printed dots for each unit area and an output characteristic (e.g., reflection density) of the printer does not often become liner, the liner relation between the input level of the C, M and Y eight-bit image data and the output characteristic of the printer at this time is assured by the output gamma correction.

The above is the explanation of the operation of the coloring process to convert the R, G and B eight-bit image data into the C, M and Y eight-bit image data conformed to the coloring materials of the output apparatus.

Since the color recording apparatus in the present embodiment is the binary recording apparatus, the C, M and Y eight-bit image data are subjected to the quantization process by a next-stage quantization processing unit 303, whereby the C, M and Y one-bit image data are generated. Here, it should be noted that a known error diffusion method and a known dither method are conventionally used as the quantization method.

Figure 3:
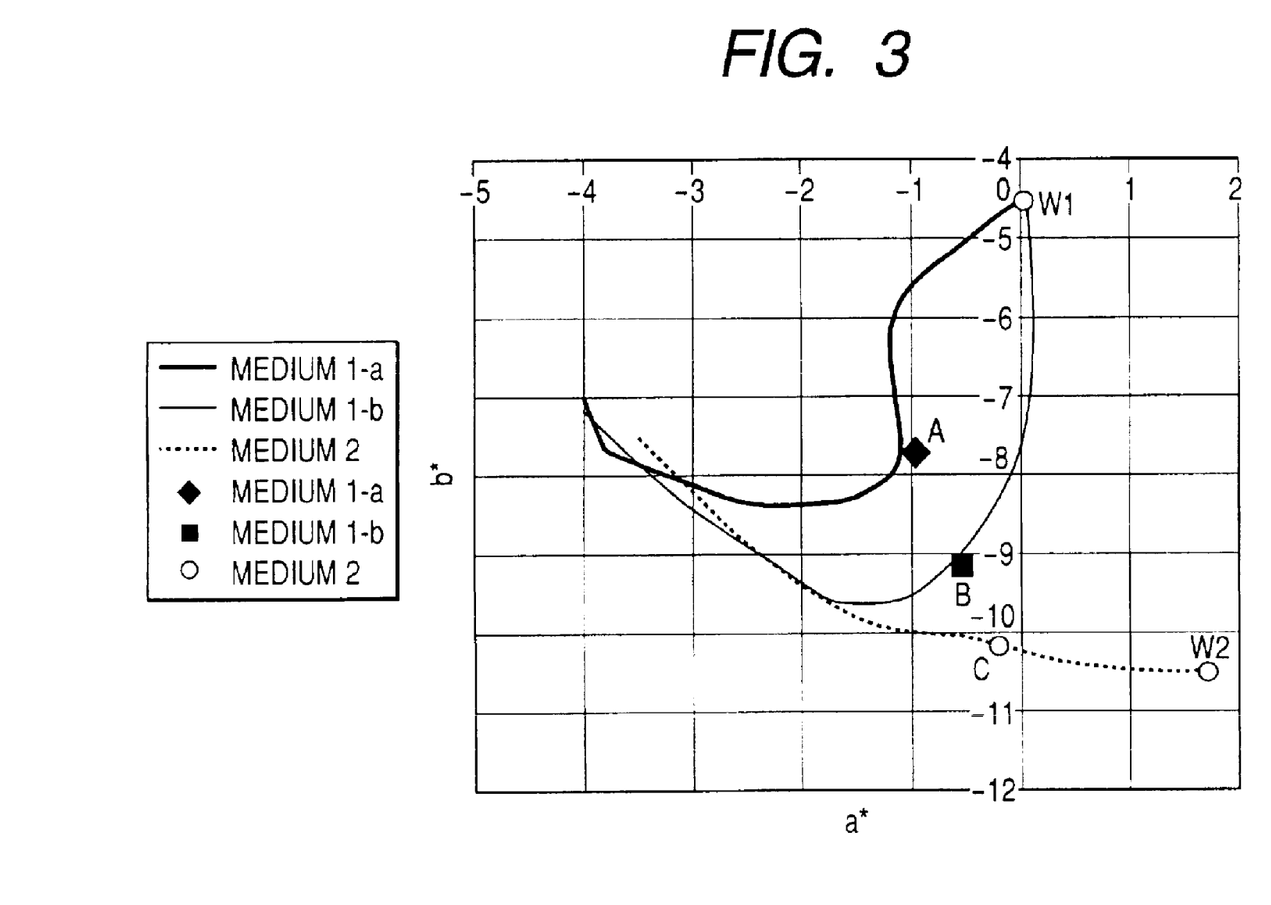
FIG. 3 is a graph showing colorimetry values of gray lines according to the embodiment of the present invention.

FIG. 3 is a graph showing colorimetry values from white to black in the gray scale in modes that the combinations of C, M and Y are different on an identical medium 1 and the gray scale on a medium 2. There are the plural modes according to the combinations of print objects (graphic, photograph, etc.), print modes (high speed, high image quality, etc.), and quantization methods (error diffusion method, dither method, etc.) set by the printer driver displayed on a not-shown monitor of the host computer, and parameters of the three-dimensional LUT differ according to the differences of these modes, whereby the C, M and Y eight-bit image data after the conversion with respect to the input R, G and B image data differ. Here, a medium 1-*a* indicates the data printed on the medium 1 in a mode a, and a medium 1-*b* indicates the data printed on the medium 1 in a mode b. The combination of C, M and Y used in the printing in the mode a is different from that in the mode b, whereby the colors of the data output in the modes a and b are different from each other. A point W1 is the white point (paper color) on the medium 1, and a point W2 is the white point (paper color) on the medium 2. As can be known from FIG. 3, the paper color of the medium 1 is remarkably different from that of the medium 2, whereby the measured values in the vicinity of white are quite different between the media 1 and 2.

Points A, B and C indicate, in the gray scales of the respective media 1-*a*, 1-*b* and 2, the points of a*b* in a case where gray patches providing brightness L=80 (or called brightness 80) and the vicinity are respectively subjected to colorimetry. Here, it should be noted that the brightness 80 corresponds to the brightness obtained by a general skin color. The inventor of the present invention experimentally found that the color of gray, particularly the value of b*, in the vicinity of L=80 and the vicinity close to the brightness of the skin color greatly influences the skin color. As can be understood from FIG. 3, in the portion darker than the brightness 80 and the vicinity (i.e., the left of the points A, B and C), almost the same colorimetry values are obtained in any of the three modes. However, in the portion lighter than the brightness 80 and the vicinity, the skin colors of the actual images on the media 1-*a* and 1-*b* are visually observed as if the skin color on the medium 1-*a* is different from that on the medium 1-*b* although the media 1-*a* and 1-*b* are the same paper (i.e., the value of the skin color on the medium 1-*a* is far from the value of the skin color on the medium 1-*b* in FIG. 3). That is, since a complexion on the medium 1-*a* is appreciably yellowish as compared with that on the medium 1-*b*, the skin color on the medium 1-*a* is not the desirable skin color. On the contrary, although the medium 2 is the image-formed recording medium having the white point different from that on the medium 1, (a*, b*) representing the color in the case where the gray patch in the vicinity of L=80 is subjected to the colorimetry is close to the medium 1-*b*. Moreover, the skin color on the medium 2 is similar to that on the medium 1-*b*, that is, it is the desirable skin color which is not yellowish. The result of this indicates that it is possible to obtain the desirable skin color on either media 1 and 2 if the color in the vicinity of L=80 is set to be close to (a*, b*)=(−0.5, −9) with respect to the media 1 and 2. Moreover, even when other medium and other mode are used, if the three-dimensional LUT is set and prepared so that the printed result in case of converting the data of R=G=B into the C, M and Y data by the three-dimensional LUT comes to close to L=80 and the vicinity and its (a*, b*) similarly targets for (−0.5, −9) and the vicinity, the desirable skin color can be similarly reproduced. Here, it should be noted that, in this case, L=80 and the vicinity and (a*, b*)=(−0.5, −9) and the vicinity are within the color difference of about 3 (within about ±3 in the respective axis directions of L, a* and b* for (L, a*, b*)=(80, −0.5, −9)).

Figure 4:
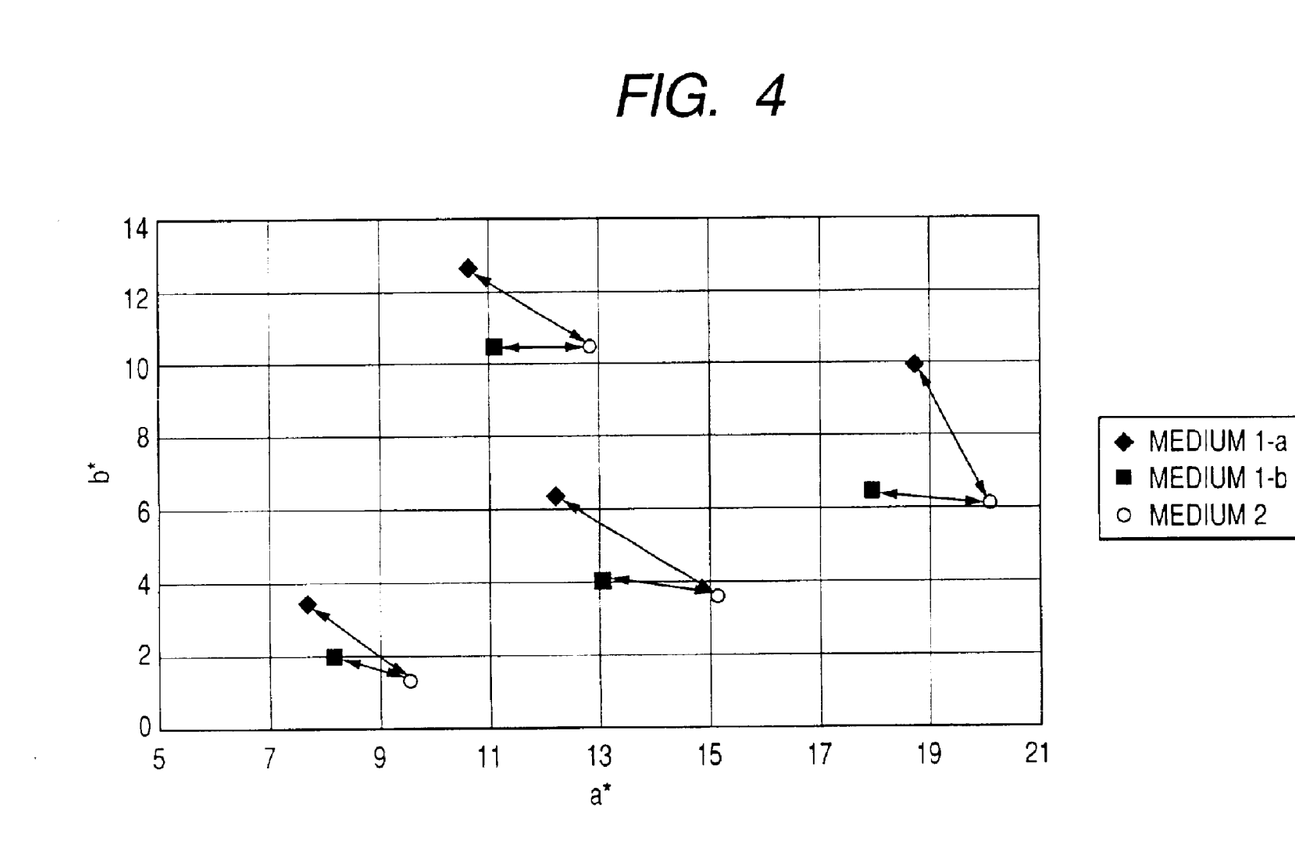
FIG. 4 is a graph showing colorimetry values of a skin color according to the embodiment of the present invention.

FIG. 4 is a diagram showing the colorimetry values of the general skin color in the respective modes of providing the gray scales in FIG. 3. The state that the colorimetry values are close to each other indicates that the R, G and B input data of the skin color are reproduced on the respective media by substantially the same or equivalent color. If the media 1-*a* and 1-*b* are compared with each other, the skin color more closer to the skin color on the medium 2 can be reproduced on the medium 1-*b* because the colors on the media 1-*b* and 2 in the vicinity of L=80 in the gray scale are close to each other. That is, even on the media of which the white points are remarkably different from each other, it is possible to reproduce substantially the same skin color respectively on the different image-formed recording media if the colors of gray in the vicinity of the brightness L=80 close to the skin color are set to be substantially the same or equivalent on these media. Moreover, by changing the color of gray in the vicinity of L=80 being the target, it is possible to easily adjust the skin color and easily reproduce the desirable skin color. For example, if a user whishes to adjust the skin color to be more yellowish, he only has to make b* of the color of gray in the vicinity of the brightness L=80 larger than the above value (a*, b*)=(−0.5, −9).

It should be noted that the tint of the desirable skin color is different according to countries, cultures and races. However, even in such a case, it is possible by adjusting the color of gray in the vicinity of L=80 to easily reproduce the skin color desirable for the user.

The present invention is not limited to the above embodiment but is applicable within the range of the known art. That is, in the embodiment, the example that the image data is printed by the inks of three colors Y, M and C is shown. However, it is possible to print the image data by a recording apparatus using four-color inks including K in addition to Y, M and C or a recording apparatus using inks including light C and M inks in addition to ordinary C and M inks. Moreover, the present invention is applicable not only to the ink-jet printer but also to an electrophotographic printer and a thermal transfer printer.

Moreover, the image processing unit may be provided in the main body of the printer. By such a structure, if the image data of R=G=B are converted into the data of achromatic color of which brightness is approximately 80 and (a*, b*)=(−0.5, −9) by using the three-dimensional LUT (i.e., the adjustment of the gray line), it is possible to reproduce the natural skin color even if the image forming is performed on any kind of medium.

According to the first embodiment, the R, G and B eight-bit signals are converted into the image data (representing gray) of R=G=B by using the three-dimensional LUT for converting these signals into the C, M and Y data of the coloring materials used in the image recording apparatus. At this time, with respect to the C, M and Y data that the brightness of the printed result obtained by printing the C, M and Y data after the conversion on the medium is 80 and the vicinity, the three-dimensional LUT for the RGB/CMY conversion to achieve the colorimetry value (a*, b*)=(−0.5, −9) is set and prepared in the printer driver, whereby the desirable skin color can be reproduced.

It should be noted that the above three-dimensional LUT's of which the number corresponds to the number of combinations of the kinds of media (plain paper, coated paper, glossy paper, etc.), the print objects (graphic, photograph, etc.), the print modes (high speed, high image quality), the quantization methods (error diffusion method, dither method) and the like set by the user on the setting screen of the printer driver displayed on the not-shown monitor of the host computer 201 are prepared beforehand by the printer driver.

Then, in the case where any medium is designated as the recording medium in the image data printing on the setting screen of the printer driver, when the printed result obtained by converting the R=G=B input data into the C, M and Y data and then recording the converted data on the medium is brightness 80 and the vicinity, the three-dimensional LUT determined by the setting including the above medium designation functions as the RGB/YMCK conversion table by which the colorimetry value (a*, b*) is converted approximately into (−0.5, −9). Therefore, it is possible to reproduce the desirable skin color even when any medium is designated by the printer driver.

In the case where the image processing unit is provided in the main body of the printer, the setting of the image processing unit is performed on the display unit provided in the printer, and this image processing unit includes the above three-dimensional LUT to be able to reproduce the desirable skin color.

(Other Embodiments)

In the above embodiment, even if any medium is set by any printer driver, the color processing parameter for converting the input data of R=G=B in the vicinity of brightness 80 into the C, M and Y data of approximately (a*, b*)=(−0.5, −9) is set and prepared. However, in case of the setting to print an image that possibility including a person (i.e., skin color) is extremely low (e.g., a print mode is set to be graphic and high speed), it is possible to provide on the three-dimensional LUT the color processing parameter taking account of the continuity of the gray lines instead of the color processing parameter for converting the input data of R=G=B in the vicinity of brightness 80 into the C, M and Y data of approximately (a*, b*)=(−0.5, −9).

As a result, in a case where the image that the skin color is not apparently reproduced by the setting is processed, a smooth gray change can be obtained. On the other hand, in a case where a photograph that possibility to print the skin color is extremely high, a glossy paper, high quality image reproduction, error diffusion and the like are set, image data reproduction with satisfactory skin color can be achieved.

It is needless to say that the process of the above embodiments can be achieved in a case where a storage medium (or a recording medium) such as a CD, an MD, a memory card, an MO or the like storing the program codes of software to realize the functions of the above embodiments is supplied to a user, the user installs the storage medium in a system or an apparatus, and then a computer (or CPU or MPU) in the system or the apparatus reads and executes the program codes stored in the storage medium. In this case, the program codes themselves read from the storage medium realize the functions of the above embodiments.

Moreover, it is needless to say that the present invention also includes not only a case where the functions of the above embodiments are realized by executing the program codes read by the computer, but also a case where an OS (operating system) or the like functioning on the computer executes a part or all of the actual process according to the instructions of the program codes, whereby the functions of the above embodiments are achieved by that process.

Moreover, it is needless to say that the present invention includes a case where the program codes read from the storage medium are once written in a memory provided in a function expansion card inserted in the computer or a function expansion unit connected to the computer, and then a CPU or the like provided in the function expansion card or the function expansion unit executes a part or all of the actual process according to the instructions of the program codes, whereby the functions of the above embodiments are achieved by that process.

As explained above, according to the present invention, the skin color difficult to be satisfactorily reproduced can be easily converted into a desirable color by controlling gray. Moreover, the skin color on the various media can be approximately unified by setting the color of gray having high brightness to be approximately the same or equivalent even on the plural media respectively having different paper colors.

What is claimed is:

1. An image processing method for converting R (red), G (green) and B (blue) multivalued image signals into color signals corresponding to coloring materials used by image forming means, said method comprising the step of:

converting an achromatic color used to control a skin color at a predetermined brightness into a color satisfying a predetermined value.

2. An image processing method according to claim 1, wherein the predetermined brightness is approximately equivalent to 80.

3. An image processing method according to claim 1, wherein the predetermined value is approximately equivalent to (a*, b*)=(−0.5, −9).

4. An image processing method according to claim 1, wherein said converting step uses a three-dimensional LUT (look-up table) for converting the R, G and B signals into C (cyan), M (magenta) and Y (yellow) signals.

5. An image processing method according to claim 4, wherein the three-dimensional LUT is stored in a printer driver, and said image processing method is executed by the printer driver.

6. An image processing method for converting R (red), G (green) and B (blue) signals into image recording signals, said method comprising the steps of:

designating a medium; and converting, irrespective of a kind of the designated medium, R (red), G (green) and B (blue) signals representing gray having a brightness approximately equivalent to a brightness of a skin color into image recording signals representing a predetermined color on the medium.

7. An image processing method according to claim 6, wherein the brightness of the skin color is approximately equivalent to 80.

8. An image processing method according to claim 6, wherein the predetermined color is a color satisfying (a*, b*)=(−0.5, −9).

9. An image processing method according to claim 6, wherein said converting step uses a three-dimensional LUT (look-up table) for converting the R, G and B signals into C (cyan), M (magenta) and Y (yellow) signals.

10. An image processing method according to claim 6, wherein said image processing method is executed by a printer driver, and the medium is set on a setting unit of the printer driver.

11. An image processing method according to claim 6, wherein said converting step uses a different three-dimensional LUT for the medium.

12. An image processing apparatus which converts R (red), G (green) and B (blue) multivalued image signals into color signals corresponding to coloring materials used by image forming means, said apparatus comprising:

converting means for converting an achromatic color used to control a skin color at a predetermined brightness into a color satisfying a predetermined value.

13. An image processing apparatus according to claim 12, wherein the predetermined brightness is approximately equivalent to 80.

14. An image processing apparatus according to claim 12, wherein the predetermined value is approximately equivalent to (a*, b*)=(−0.5, −9).

15. An image processing apparatus according to claim 12, wherein said converting means includes a three-dimensional LUT (look-up table) for converting the R, G and B signals into C (cyan), M (magenta) and Y (yellow) signals.

16. An image processing apparatus according to claim 15, wherein the three-dimensional LUT is stored in a printer driver, and said converting means is operated by the printer driver.

17. An image processing apparatus for converting R (red), G (green) and B (blue) signals into image recording signals, said apparatus comprising:

means for designating a medium; and means for converting, irrespective of a kind of the designated medium, R (red), G (green) and B (blue) signals representing gray having a brightness approximately equivalent to a brightness of a skin color into image recording signals representing a predetermined color on the medium.

18. An image processing apparatus according to claim 17, wherein the brightness of the skin color is approximately equivalent to 80.

19. An image processing apparatus according to claim 17, wherein the predetermined color is a color satisfying (a*, b*)=(−0.5, −9).

20. An image processing apparatus according to claim 17, wherein said converting means includes a three-dimensional LUT (look-up table) for converting the R, G and B signals into C (cyan), M (magenta) and Y (yellow) signals.

21. An image processing apparatus according to claim 17, wherein the conversion is performed by a printer driver, and the medium is set on a setting unit of the printer driver.

22. An image processing apparatus according to claim 17, wherein said converting means includes a different three-dimensional LUT for each medium.

23. A storage medium which stores a program for converting R (red), G (green) and B (blue) multivalued image signals into color signals corresponding to coloring materials used by image forming means, said program comprising:

code for inputting the R, G and B image signals;

code for converting an achromatic color used to control a skin color at a predetermined brightness into a color satisfying a predetermined value.

24. A storage medium according to claim 23, wherein the predetermined brightness is approximately equivalent to 80.

25. A storage medium according to claim 23, wherein the predetermined value is approximately equivalent to (a*, b*)=(−0.5, −9).

26. A storage medium according to claim 23, wherein said converting code includes a three-dimensional LUT (look-up table) for converting the R, G and B signals into C (cyan), M (magenta) and Y (yellow) signals.

27. A storage medium according to claim 26, wherein the LUT is stored in a printer driver, and said converting code is executed by the printer driver.

28. A storage medium which stores a program for converting R (red), G (green) and B (blue) signals into image recording signals, said program comprising:

code for designating a medium; and code for converting, irrespective of a kind of the designated medium, R (red), G (green) and B (blue) signals representing gray having a brightness of a skin color into image recording signals representing a predetermined color on the medium.

29. A storage medium according to claim 28, wherein the brightness of the skin color is approximately equivalent to 80.

30. A storage medium according to claim 28, wherein the predetermined color is a color satisfying (a*, b*)=(−0.5, −9).

31. A storage medium according to claim 28, wherein said converting code includes a three-dimensional LUT (look-up table) for converting the R, G and B signals into C (cyan), M (magenta) and Y (yellow) signals.

32. A storage medium according to claim 28, wherein said converting code is executed by a printer driver, and the medium is set on a setting unit of the printer driver.

33. A storage medium according to claim 28, wherein said converting code includes a different three-dimensional LUT for the medium.

34. A program for converting R (red), G (green) and B (blue) multivalued image signals into color signals corresponding to coloring materials used by image forming means, said program comprising:

code for inputting the R, G and B image signals; and code for converting an achromatic color used to control a skin color at a predetermined brightness into a color satisfying a predetermined value.

35. A program for converting R (red), G (green) and B (blue) signals into image recording signals, said program comprising:

code for designating a medium; and code for converting, irrespective of a kind of the designated medium, R (red), G (green) and B (blue) signals representing gray having a brightness of a skin color into image recording signals representing a predetermined color on the medium.

* * * * *